(12) United States Patent
Leblon

(10) Patent No.: US 9,062,643 B2
(45) Date of Patent: Jun. 23, 2015

(54) METHOD FOR DETERMINING THE AMOUNT OF FUEL LEAVING AN INJECTOR

(75) Inventor: Michael Leblon, Bressols (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 0 days.

(21) Appl. No.: 14/115,694

(22) PCT Filed: Apr. 17, 2012

(86) PCT No.: PCT/EP2012/001650
§ 371 (c)(1),
(2), (4) Date: Dec. 24, 2013

(87) PCT Pub. No.: WO2012/156015
PCT Pub. Date: Nov. 22, 2012

(65) Prior Publication Data
US 2014/0102186 A1    Apr. 17, 2014

(30) Foreign Application Priority Data
May 13, 2011  (FR) ..................... 11 01457

(51) Int. Cl.
*F02M 65/00* (2006.01)
*F02D 35/02* (2006.01)
*F02D 41/22* (2006.01)
(Continued)

(52) U.S. Cl.
CPC ........... *F02M 65/001* (2013.01); *F02D 35/023* (2013.01); *F02D 41/08* (2013.01);
(Continued)

(58) Field of Classification Search
CPC ....... Y02T 10/44; Y02T 10/40; F02D 41/403; F02D 35/023; F02M 65/001
USPC ...................................... 73/114.48
See application file for complete search history.

(56) References Cited

U.S. PATENT DOCUMENTS 4,704,999 A    11/1987  Hashikawa et al.
4,739,731 A *   4/1988  Habich et al. ................. 123/494
(Continued)

FOREIGN PATENT DOCUMENTS

DE   10 2006 021090 A1    1/2008
EP       1 862 659 A1    11/1987
(Continued)

OTHER PUBLICATIONS

International Search Report, dated Jul. 11, 2012, from corresponding PCT application.

*Primary Examiner* — Freddie Kirkland, III
(74) *Attorney, Agent, or Firm* — Young & Thompson

(57) ABSTRACT

A method for determining the quantity of fuel leaving an injector of a direct-injection diesel engine, the quantity of fuel supplying a cylinder of the engine in which a piston moves, the injection of fuel being performed by a pilot injection during which a first quantity of fuel is injected into the cylinder followed by a main injection during which a second quantity of fuel, greater than the first quantity of fuel, is injected into the cylinder, the method including the following steps: a) operating the engine at idle speed, b) determining the maximum pressure in the cylinder, and c) determining, from the maximum pressure, the quantity of fuel injected into the cylinder during the pilot injection, by way of a predefined one-to-one relationship, at idle speed, between a maximum pressure value in the cylinder and a quantity of fuel injected into the cylinder during the pilot injection.

15 Claims, 2 Drawing Sheets

Figure 3:
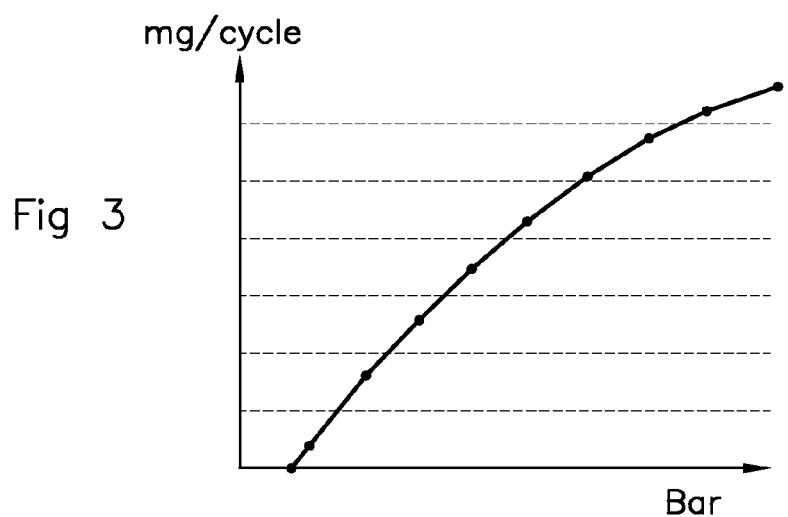

(51) Int. Cl.
   *F02D 41/08* (2006.01)
   *F02D 41/16* (2006.01)
   *F02D 41/24* (2006.01)

(52) U.S. Cl.
   CPC ............ *F02D 41/16* (2013.01); *F02D 41/221* (2013.01); *F02D 41/2467* (2013.01); *F02D 2200/0616* (2013.01); *Y02T 10/40* (2013.01)

(56) References Cited

U.S. PATENT DOCUMENTS

| | | | |
|---|---|---|---|
| 4,760,830 A * | 8/1988 | Bullis et al. | 123/501 |
| 5,884,602 A * | 3/1999 | Friedrich et al. | 123/300 |
| 5,904,127 A * | 5/1999 | Kemmler et al. | 123/295 |
| 6,053,150 A * | 4/2000 | Takahashi et al. | 123/501 |
| 6,505,500 B1 * | 1/2003 | Elgh et al. | 73/35.08 |
| 2004/0149272 A1* | 8/2004 | Kurtz et al. | 123/568.21 |
| 2006/0107936 A1* | 5/2006 | Mazet | 123/672 |

FOREIGN PATENT DOCUMENTS

| | | |
|---|---|---|
| FR | 2 846 373 A1 | 4/2004 |
| WO | 99/61771 A1 | 12/1999 |

* cited by examiner

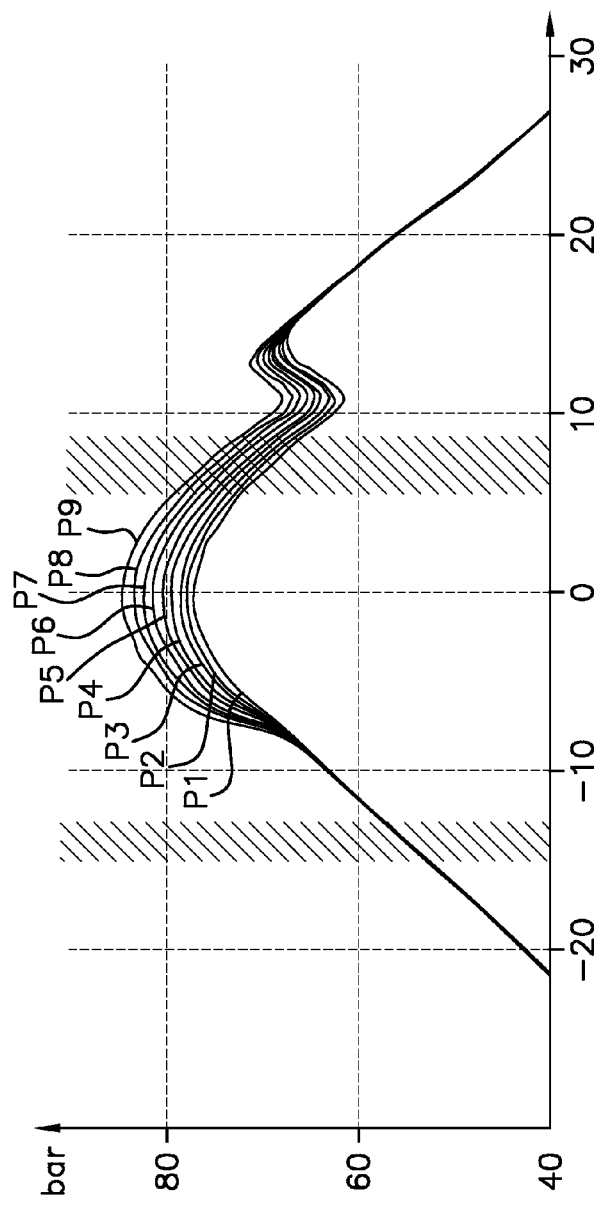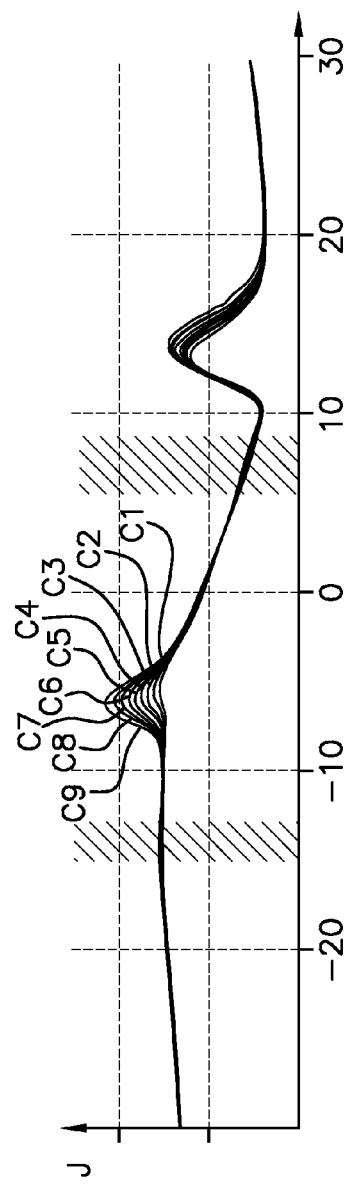
Fig 1
Fig 2

METHOD FOR DETERMINING THE AMOUNT OF FUEL LEAVING AN INJECTOR

BACKGROUND OF THE INVENTION

1. Field of the Invention

The present invention relates to a method for determining the quantity of fuel leaving an injector of a direct-injection diesel engine and supplying a cylinder of an internal combustion chamber of said engine. The invention relates more particularly to the so-called "common injection rail" engines.

2. Description of the Related Art

In this type of engine, the injection of fuel into the cylinder is conventionally performed in two stages. A first, small quantity of fuel is injected, one or more times, before the top dead center (TDC) point of the piston associated with the cylinder, then a second, greater quantity of fuel after the top dead center point. The injection of said first quantity of fuel, commonly called pilot injection, serves to prepare the combustion of the second quantity of fuel delivered by the following injection, called main injection. The aim of this two-stage injection is notably to reduce the operating noise, the unburned gas emissions and the fuel consumption of the engine.

During the life of the injector, it happens that the quantities of fuel delivered during the pilot injections and the main injections drift from the nominal values supplied by the manufacturer. There are many reasons for these drifts: clogging of the injector, incorrect mounting thereof in the wall of the combustion chamber, wear, etc. These drifts can notably lead to an increase in engine noise and/or in vibrations and/or rattling noises and/or pollutant emissions.

When, following a complaint from the end user, a vehicle has to be analyzed by the constructor network for one of the abovementioned problems, a certain number of inspection points are performed on the vehicle and one of these inspection points consists in checking the correct operation of the injectors.

At the present time, the constructor network has only few means for checking the correct operation of the injectors. The injectors are then generally sent for analysis to the injector manufacturer. In practice, a technician of the constructor network dismantles the injectors and sends them to his component return center which in turn sends them to the injector manufacturer for analysis. The analysis is then carried out in a laboratory with high-technology equipment making it possible notably to accurately measure minute quantities of injected fuel. This transmission and analysis process can take several weeks. For the vehicle not to be immobilized throughout this period, provision is made, after the dismantling of the injectors to be analyzed, for the latter to be replaced with new injectors without waiting for the analysis results. This replacement of the injectors therefore incurs costs which are borne either by the automobile constructor, or by the injector manufacturer, or both, depending on the analysis results.

The analysis results do not, however, always make it possible to determine the exact origin of the problem. In practice, upon its introduction into the analysis laboratory, each injector is generally cleaned, for example by ultrasound, in order to remove the agents (soot, etc.) likely to contaminate the laboratory flow rate measurement appliances used to measure the quantities of fuel leaving the injector. The injector is also sometimes disassembled in order to carry out more comprehensive investigations. The results obtained are therefore the results of analysis of the injector after cleaning and/or disassembly. If the results thus obtained indicate that the flow rate measurement at a predefined reference point is in accordance with a flow rate measurement performed originally at the end of the production line and/or that this measurement remains within a predetermined variation band defined by the constructor, this indicates only that the injector operates correctly after cleaning and/or disassembly. It is impossible to know the exact origin of the problem.

In practice, it is then possible that the injector is not the source of the malfunction, or even that said malfunction has been resolved by the act of cleaning and/or disassembling the injector. This solution is therefore unsatisfactory in terms of costs, diagnosis times and diagnosis made on the basis of the results.

Also, one of the aims of the invention is to propose a non-intrusive method for diagnosing the functionality of an injector by the determination of the quantity of fuel leaving the injector of a direct-injection diesel engine which is simple to implement in the constructor network, which is reliable and which does not require said injector to be dismantled.

The document EP 1 862 659 is known, which notably teaches a method and a device for determining a pilot injection flow rate from the integration, over an angular window of the crankshaft corresponding to the pilot injection, of the instantaneous quantity of heat released in the combustion chamber, obtained from a pressure measurement within the pilot injection band. Such a method requires significant computation and memory means.

SUMMARY OF THE INVENTION

The present invention aims to mitigate these drawbacks. To this end, the invention relates to a non-intrusive method for determining the quantity of fuel leaving an injector of a common rail direct-injection diesel engine, said quantity of fuel supplying a cylinder of said engine in which a piston moves, the injection of fuel being performed by a pilot injection during which a first quantity of fuel is injected into the combustion chamber followed by a main injection during which a second quantity of fuel, greater than the first quantity of fuel, is injected into the combustion chamber. The method is noteworthy in that it comprises the following steps:

a) operating the engine at idle speed, b) determining the maximum pressure in the cylinder, and c) determining, from said maximum pressure, the quantity of fuel injected into the cylinder during the pilot injection, by means of a predefined one-to-one relationship, at idle speed, between a maximum pressure value in the cylinder and a quantity of fuel injected into the cylinder during the pilot injection.

Thus, according to the invention, the quantity of fuel injected during the pilot and/or main injection is determined from pressure measurements in the cylinder when the engine is operating at idle speed. In practice, at this engine speed, the maximum pressure in the cylinder, which is usually situated between the pilot injection and the main injection, depends directly on the quantity of fuel injected during the pilot injection. It is thus possible to determine the quantity of fuel leaving the injector during the pilot injection. Moreover, since the quantity of fuel injected during the main injection and the quantity of fuel injected during the pilot injection are closely linked by a predetermined correlation relationship, it is possible to deduce therefrom the quantity of fuel injected during the main injection.

According to a particular embodiment, the method according to the invention consists in determining the quantity of fuel injected into the cylinder during the main injection from the quantity of fuel injected into the cylinder during the pilot injection, by means of a predetermined correlation relationship linking said main quantity and said pilot quantity.

According to a particular embodiment, since the pressure is generally at maximum in proximity to the top dead center point of the piston, the maximum pressure is determined by measuring the pressure in the cylinder when the piston is at its top dead center point.

According to another particular embodiment, the maximum pressure is determined by performing a plurality of pressure measurements in the cylinder between the pilot injection and the main injection then by selecting the pressure measurement that has the highest value.

According to a particular embodiment, the pressure measurements are preferably carried out during a measurement interval encompassing the instant corresponding to the top dead center point of the piston and present between the instant of the pilot injection and the instant of the main injection.

Advantageously, the measurement interval is centered on the instant corresponding to the top dead center point of the piston.

According to a particular embodiment, the pressure measurements are carried out by a cylinder-pressure sensor mounted on the cylinder head. If the cylinder does not include any pressure sensor, provision can be made to install one in place of a preheating plug. In this case, the method of the invention comprises, prior to the step a), a step of dismantling the preheating plug and a step of mounting the pressure sensor in place of said preheating plug.

The method of the invention can therefore be implemented on vehicles not originally equipped with pressure sensors in the combustion chamber.

The invention also relates to a diagnostic method for an injector of a direct-injection diesel engine, comprising the following steps:
  determination of the quantity of fuel leaving the injector as defined previously,
  comparison of the determined quantity with a reference quantity, and
  preparation of a diagnostic report according to the result of the comparison.

BRIEF DESCRIPTION OF THE DRAWING FIGURES

Figure 4:
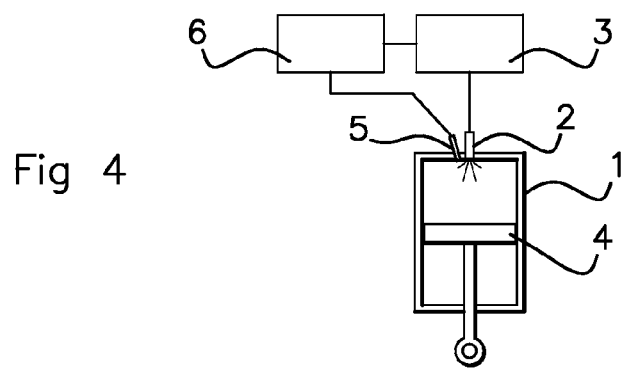
Figure 5:
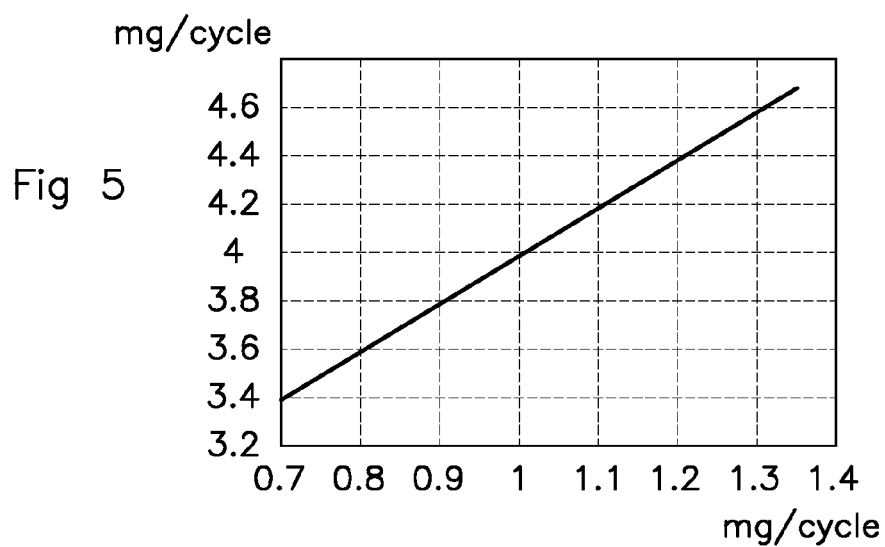

The invention will be better understood, and other aims, details, features and advantages will become more clearly apparent from the following detailed explanatory description, by referring below to the appended drawings, which represent:

FIG. 1, a diagram illustrating the pressure present in the cylinder as a function of the crankshaft angle of the engine when the engine is operating at idle speed;

FIG. 2, a diagram illustrating the heat released in the cylinder as a function of the crankshaft angle of the engine when the engine is operating at idle speed;

FIG. 3, a diagram illustrating the relationship between the quantity of fuel delivered by the pilot injection and the maximum pressure in the cylinder when the engine is operating at idle speed;

FIG. 4, a diagram of a cylinder equipped with a pressure sensor for the implementation of the method of the invention, and FIG. 5, a diagram illustrating the correlation between the quantity of fuel determined for the pilot injection and the quantity of fuel delivered by the main injection.

DETAILED DESCRIPTION OF THE INVENTION

According to the invention, it is proposed to determine the quantity of fuel injected during the pilot and/or main injection from pressure measurements in the cylinder when the engine is operating at idle speed.

By referring to FIGS. 1 and 2, it can be seen that, when the engine is at idle speed, the pressure and the heat released in the cylinder change during the displacement of the piston in the combustion chamber. The pilot injection is applied before the top dead center point of the piston, said top dead center (TDC) point corresponding to a crankshaft angle equal to 0°. It is, for example, performed between the −15° and −12° angular positions of the crankshaft, as illustrated in FIGS. 1 and 2 by the leftmost shaded area. The main injection is performed after the TDC, for example between the 6° and 9° angular positions of the crankshaft, as illustrated in FIGS. 1 and 2 by the rightmost shaded area.

As can be seen in FIG. 1, the pressure inside the cylinder increases as the piston approaches the top dead center point. It increases substantially linearly up to the combustion of the fuel from the pilot injection. This combustion occurs approximately between the −9° and −5° angular positions of the crankshaft. At the moment of this combustion, the heat released in the cylinder increases abruptly. This release of heat is then accompanied by an increase in pressure inside the cylinder. As can be seen in these figures, these increases in heat released and pressure depend on the quantity of fuel delivered during the pilot injection, called pilot quantity hereinbelow in the description.

FIG. 1 represents nine pressure curves, referenced P1 to P9, and FIG. 2 represents nine heat released curves, referenced C1 to C9, each of these curves corresponding to a given pilot quantity. The table below indicates the pilot quantities associated with each of said curves:

| Pressure curve (bar) | Heat curve (J) | Pilot quantity (mg/cycle) |
|---|---|---|
| P1 | C1 | 0.80 |
| P2 | C2 | 0.85 |
| P3 | C3 | 0.90 |
| P4 | C4 | 0.95 |
| P5 | C5 | 1.00 |
| P6 | C6 | 1.05 |
| P7 | C7 | 1.10 |
| P8 | C8 | 1.15 |
| P9 | C9 | 1.20 |

As can be seen in FIG. 1, the greater the pilot quantity, the more the maximum pressure inside the cylinder increases. Thus, the maximum pressure of the curve Pn is greater than that of the curve Pn−1, n being between 2 and 9 in the present case. For each curve, the pressure increases until the piston reaches its top dead center point. It then decreases until the combustion of the fuel from the main injection and then increases again during the combustion of the fuel from the main injection and finally decreases as the piston descends in the cylinder.

It emerges from these figures that the pilot quantity is directly linked to the maximum pressure inside the cylinder when the engine is at idle speed. Thus, if the maximum pressure inside the cylinder is measured, the pilot quantity can be deduced therefrom. It is also possible to deduce therefrom the main quantity (quantity of fuel leaving the injector during the main injection), the main quantity and the pilot quantity being linked by a predetermined correlation relationship, conventionally an affine function.

FIG. 3 illustrates the relationship between the pilot quantity and the maximum pressure in the cylinder. The pilot quantity (on the y axis) is expressed in milligrams per cycle, a cycle corresponding to two engine revolutions, and the maximum pressure (on the x axis) is expressed in bar. Each maximum pressure value has an associated pilot quantity. A measurement of the maximum pressure therefore makes it possible to deduce therefrom a pilot quantity.

In the case illustrated by FIGS. 1 to 3, the maximum pressure is reached when the piston is at the top dead center point (crankshaft angle at 0°). It is then sufficient to perform a pressure measurement at the top dead center point of the piston to determine the maximum pressure.

Since the maximum pressure is not always present at the top dead center point, provision is advantageously made for a plurality of pressure measurements to be performed, preferably over a measurement time interval encompassing the instant when the piston reaches its top dead center point, and the highest measurement is selected to obtain the maximum pressure. This measurement time interval is conventionally situated between the instant of the pilot injection and the instant of the main injection and is, for example, centered on the top dead center point of the piston.

The pressure measurements are performed by a pressure sensor mounted on the cylinder head. If the engine does not include any sensor for measuring the cylinder pressure, one can be mounted in place of the preheating plug of the cylinder. This sensor is, for example, a piezoelectric high-temperature pressure sensor. The latter is installed directly in the well of the plug.

FIG. 4 schematically illustrates a cylinder 1 of an internal combustion diesel engine of the direct injection type. This cylinder is equipped with a fuel injector 2 opening onto the inner wall of the cylinder. A control circuit 3, comprising an engine computer, is provided to control the instants of opening of the injector 2 during the pilot injection and the main injection. A piston 4 can be displaced inside the cylinder 1.

According to the invention, the cylinder 1 is, moreover, equipped with a pressure sensor 5 opening onto the inner wall of the cylinder 1 to measure the cylinder pressure. This sensor is linked to a unit 6 for determining the pilot quantity and/or main quantity from pressure measurements originating from the sensor 5.

The unit 6 can be coupled to the control circuit 3 to be synchronized on the injections. The unit 6 recovers one or more cylinder pressure measurements and determines the maximum pressure then determines the pilot quantity and/or the main quantity by using, for example, mapping tables associating, with each maximum pressure value, a given pilot quantity and/or main quantity. These mapping tables are pre-stored in the unit 6 after having been predefined beforehand by the injector manufacturer.

FIG. 5 illustrates the correlation that can exist between the pilot quantity (on the x axis) and the main quantity (on the y axis) for a given injector. In this example, the correlation is an affine function. The main quantity can then be determined by a simple calculation from the pilot quantity or by a mapping table from the maximum pressure.

The unit 6 can be directly incorporated in the computer of the vehicle, in another computer, or in the constructor's inspection tools.

With this method, the constructor network does not need to dismantle the injector 2. In practice, the preheating plug is replaced by the cylinder-pressure sensor and the latter is connected, if necessary, to the unit 6. The engine is started up and then operates at idle speed. The pilot and/or main quantity is displayed on a screen of the unit 6 or on a computer or on an inspection tool supplied by the constructor.

Advantageously, the unit 6 also supplies a diagnosis of the injector 2 by indicating whether it conforms to a measurement carried out at the end of the production line.

In practice, the injector manufacturer conventionally carries out, at the end of the production line, a number of pressure-flow rate measurements, called reference points, on each of the injectors, these measurements being carried out with particular measurement tools. The aim of these reference points is to characterize the injector. However, they are not measured in a cylinder and cannot therefore be directly compared to the quantity of fuel determined as indicated previously.

For this, the determined pilot quantity is converted into a quantity corresponding to the quantity of fuel which would be delivered by the injector with conditions similar to those of one of these reference points. This conversion can be carried out by calculation or by a predefined mapping table. This quantity is then compared to the quantity of the reference point pre-recorded at the end of the production line, to determine whether the injector has drifted and/or whether it is still within the variation band defined by the constructor at the end of the line.

This conversion and this comparison are carried out by the unit 6. The unit 6 displays on its screen, the deviation between the converted quantity and the pre-recorded quantity and advantageously indicates whether the injector 2 still conforms to the requirements of the constructor. The quantity of fuel of the reference point pre-recorded at the end of the production line is, for example, obtained by a code etched on the injector 2. A quantity at the end of the production line is associated with this code in a database stored in the unit 6 or accessible to the latter. The technician enters, on the inspection tool, the code etched on the injector 2 to identify the injector to be analyzed.

Although the invention has been described in conjunction with a particular embodiment, obviously it is in no way limited thereto and it includes all the technical equivalents to the means described as well as their combinations if the latter fall within the context of the invention.

The invention claimed is:

1. A method for determining a quantity of fuel leaving an injector of a direct-injection diesel engine, said quantity of fuel supplying a cylinder of said engine in which a piston moves, the injection of fuel being performed by a pilot injection during which a first quantity of fuel is injected into the cylinder followed by a main injection during which a second quantity of fuel, greater than the first quantity of fuel, is injected into the cylinder, said method comprising:
 a) operating the engine at an idle speed;
 b) determining a maximum pressure in the cylinder; and
 c) determining, from said maximum pressure, the quantity of fuel injected into the cylinder during the pilot injection, by means of a predefined one-to-one relationship, at the idle speed, between a maximum pressure value in the cylinder and a quantity of fuel injected into the cylinder during the pilot injection.

2. The method as claimed in claim 1, further comprising; determining the quantity of fuel injected into the cylinder during the main injection from the quantity of fuel injected into the cylinder during the pilot injection, by means of a predetermined correlation relationship linking said main quantity and said pilot quantity.

3. The method as claimed in claim 2, wherein the piston reaching its top dead center point between the pilot injection and the main injection, the maximum pressure is determined by measuring the pressure in the cylinder when the piston is at the top dead center point.

4. The method as claimed in claim 2, wherein the maximum pressure is determined by performing a plurality of pressure measurements in the cylinder then by selecting the pressure measurement that has the highest value.

5. The method as claimed in claim 1, wherein the piston reaching its top dead center point between the pilot injection and the main injection, the maximum pressure is determined by measuring the pressure in the cylinder when the piston is at the top dead center point.

6. The method as claimed in claim 5, wherein the pressure measurement(s) is/are carried out by a cylinder-pressure sensor mounted on the cylinder head.

7. The method as claimed in claim 6, further comprising:
prior to the step a), a step of dismantling a preheating plug mounted on the cylinder head and a step of mounting the pressure sensor in place of said preheating plug.

8. The method as claimed in claim 1, wherein the maximum pressure is determined by performing a plurality of pressure measurements in the cylinder then by selecting the pressure measurement that has the highest value.

9. The method as claimed in claim 8, wherein the pressure measurements are carried out during a measurement interval encompassing the instant corresponding to the top dead center point of the piston.

10. The method as claimed in claim 9, wherein the measurement interval is centered on the instant corresponding to the top dead center point of the piston.

11. The method as claimed in claim 8, wherein the pressure measurements are carried out between the instant of the pilot injection and the instant of the main injection.

12. A diagnostic method for an injector of a direct-injection diesel engine, comprising the following steps:
determining the quantity of fuel leaving the injector in accordance with the method as claimed in claim 1;
comparing said determined quantity with a reference quantity; and
preparing a diagnostic report according to the result of the comparison.

13. The method as claimed in claim 1, wherein the pilot injection is performed before top dead center of the piston between −15° and −12° angular positions of a crankshaft.

14. The method as claimed in claim 1, wherein the main injection is performed after top dead center of the piston between 6° and 9° angular positions of a crankshaft.

15. The method as claimed in claim 1, wherein combustion between −9° and −5° angular positions of a crankshaft.

* * * * *